US006850737B1

(12) United States Patent
Bruzzone et al.

(10) Patent No.: US 6,850,737 B1
(45) Date of Patent: Feb. 1, 2005

(54) ANTENNA DIRECTION FINDING IN MOBILE PHONES

(75) Inventors: Raul Bruzzone, Le Mans (FR); Abdelwaheb Marzouki, Le Mans (FR); Juha Rapeli, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/551,011

(22) Filed: Apr. 18, 2000

(30) Foreign Application Priority Data

Apr. 20, 1999 (EP) .......................................... 99400960
Oct. 26, 1999 (EP) .......................................... 99402663

(51) Int. Cl.[7] ............................ H04B 1/00; H04B 7/00

(52) U.S. Cl. .................. 455/68; 455/404.2; 455/456.1; 455/66.1; 343/757; 342/154; 244/165; 244/166; 244/167

(58) Field of Search ..................... 455/66.1, 68, 404.2, 455/456.1; 343/757–766; 342/154, 156, 350–359; 244/165, 166, 167

(56) References Cited

U.S. PATENT DOCUMENTS

| | | | | | |
|---|---|---|---|---|---|
| 3,680,124 | A | * | 7/1972 | Stone et al. | 342/424 |
| 4,675,680 | A | * | 6/1987 | Mori | 342/352 |
| 5,419,521 | A | * | 5/1995 | Matthews | 248/179.1 |
| 5,446,465 | A | * | 8/1995 | Diefes et al. | 342/352 |
| 5,471,218 | A | * | 11/1995 | Talbot et al. | 342/357.03 |
| 5,948,044 | A | * | 9/1999 | Varley et al. | 701/220 |
| 5,949,369 | A | * | 9/1999 | Bradley et al. | 342/352 |
| 6,016,120 | A | * | 1/2000 | McNabb et al. | 342/357.06 |
| 6,065,219 | A | * | 5/2000 | Murphey et al. | 33/302 |
| 6,091,546 | A | * | 7/2000 | Spitzer | 345/8 |
| 6,150,977 | A | * | 11/2000 | Wilcoxson et al. | 342/354 |

FOREIGN PATENT DOCUMENTS

| | | | | |
|---|---|---|---|---|
| JP | 02148902 | A | 6/1990 | H01Q/3/04 |
| WO | 9829968 | A2 | 7/1998 | H04B/7/26 |
| WO | 9829968 | A3 | 7/1998 | H04B/7/185 |

OTHER PUBLICATIONS

By K. Fuimoto et al., "Mobile Antenna Systems Handbook" Artech House, Inc., 1994, pp. 436–451.

* cited by examiner

*Primary Examiner*—William Trost
*Assistant Examiner*—Stephen D'Agosta
(74) *Attorney, Agent, or Firm*—Jack D. Slobod

(57) ABSTRACT

The present invention describes a communication system comprising a primary radio station (PS) and at least one secondary radio station (SS), intended to be in motion (MOT). The secondary radio station has at least one controllable structure (CS) for communicating with the primary radio station, and control means (CONT) for controlling the controllable structure depending on the movements of the secondary radio station. The control means of the controllable structure comprise magnetic field sensors (MFS) and gravitational field sensors (GFS) for providing measurements of the earth magnetic (H) and gravitational (G) fields, and computing means (COMP) for computing control information from these measurements. The computing means read the outputs of each sensor and make the calculations required to control the controllable structure at appropriate time intervals depending on the motion state of the secondary radio station.

12 Claims, 4 Drawing Sheets

ANTENNA DIRECTION FINDING IN MOBILE PHONES

FIELD OF THE INVENTION

The present invention relates to a communication system having at least one primary radio station and at least one secondary radio station intended to be in motion, said secondary radio station having at least one controllable structure, for communicating with said primary radio station, and control means for controlling said controllable structure depending on said motion, said control means comprising magnetic field sensors for providing measurements of the earth magnetic field.

Such a communication system can be a terrestrial and/or a satellite cellular mobile radio system or any other suitable system. It may be, for example, a mobile communication system of the third generation, working according to the UMTS (Universal Mobile Communications Systems) standard.

The present invention further relates to a radio station and radio communication methods for use in such a communication system.

BACKGROUND OF THE INVENTION

A communication system of the above kind is known from the handbook "Mobile Antenna Systems Handbook", K. Fujimoto et al., Artech House, Inc., 1994, pp. 436–451. The known system is a land mobile satellite communication system in which the primary radio stations are satellites and the secondary radio stations are mobile radio stations in vehicles. The secondary radio stations comprise a phased array antenna system as a controllable structure. The phased array antenna system has adopted an open-loop tracking method with the hybrid use of a geomagnetic sensor and an optical-fiber gyro. In the present open-loop method the optical-fiber gyro is mainly used to give the information of vehicle movements, and the geomagnetic sensor gives an absolute direction to calibrate the accumulative error of the optical-fiber gyro at an appropriate time interval.

SUMMARY OF THE INVENTION

The above-described system comprises an optical-fiber gyro. A major drawback of optical-fiber gyros is that they are relatively expensive or too slow to follow the quick movements that can be achieved, for example, by a cellular handset, which can be freely and rapidly oriented in different positions with respect to a fixed coordinate system.

It is an object of the present invention to provide a communication system of the above kind having a cheap and quick enough control mechanism for controlling a controllable structure of a secondary radio station in order to provide optimum conditions for communication.

To this end, the communication system according to the invention is characterized in that the means for controlling the controllable structure of the secondary radio station comprise gravitational field sensors for providing measurements of the earth gravitational fields, and computing means for computing control information from said measurements.

Another drawback of an optical-fiber gyro is that it can only sense relative directional variations. Consequently, this measurement is subjected to directional error during time.

It is an object of the present invention to determine an absolute measurement, in a fixed coordinate system, of radiation directions of a controllable structure, this measurement being no more affected by directional error during time.

To this end, the communication system according to the present invention is characterized in that the control means comprise a memory for storing inclination and declination values of the earth magnetic field, and the computing means include a converting step for converting coordinates of positioning information in a moving coordinate system attached to the secondary radio station, said coordinates being called local coordinates, into corresponding coordinates in a fixed coordinate system attached to earth, said coordinates being called global coordinates, this conversion being calculated from said values and measurements of the magnetic field and gravitational field sensors. This positioning information is, for example, the direction of maximum radiation of an antenna of the secondary radio station or, as another example, the direction from the secondary radio station to the primary radio station.

The secondary radio station of the communication system described in the handbook "Mobile Antenna Systems Handbook" comprises a phased array antenna system. This kind of controllable structure can not yet be used in every communication system. More specifically, it cannot be used in mobile communication systems, where the working frequencies are of the order of 1 to 2 GHz, as the present technology does not allow the manufacturing of phased array antenna systems that are small enough to reach these frequencies.

It is another object of the present invention to be used in a communication system of the third generation, working from less than 1 GHz to about 2 GHz.

To this end, the communication system according to the present invention is characterized in that said computing means allow the determination of a reference direction which is defined by a bearing vector first calculated in the local coordinate system and then converted into the global coordinate system using the converting step, said controllable structure comprises a set of directional antennas having a maximum radiation direction called heading, said converting step converts coordinates of a vector defining said heading of at least one of the directional antennas from said local coordinates into said global coordinates and said control means are intended to select at least one directional antenna among the set of directional antennas with respect to the reference direction.

More generally, the present invention comes within the scope of the Mobile Station-based Spatial Division Multiple Access (MS-SDMA) system. The MS-SDMA communication system aims at using directional antennas in order to substantially increase the traffic capacity, to improve the signal quality but also to reduce electromagnetic radiation on the human body. Consequently, the present invention is also a contribution to ensuring a better service quality to the users.

These and other aspects of the invention will be apparent from and elucidated with reference to the embodiments described hereinafter.

BRIEF DESCRIPTION OF THE DRAWINGS

The present invention will now be described, by way of example, with reference to the accompanying drawings, wherein.

DESCRIPTION OF THE PREFERRED EMBODIMENTS

Figure 1:
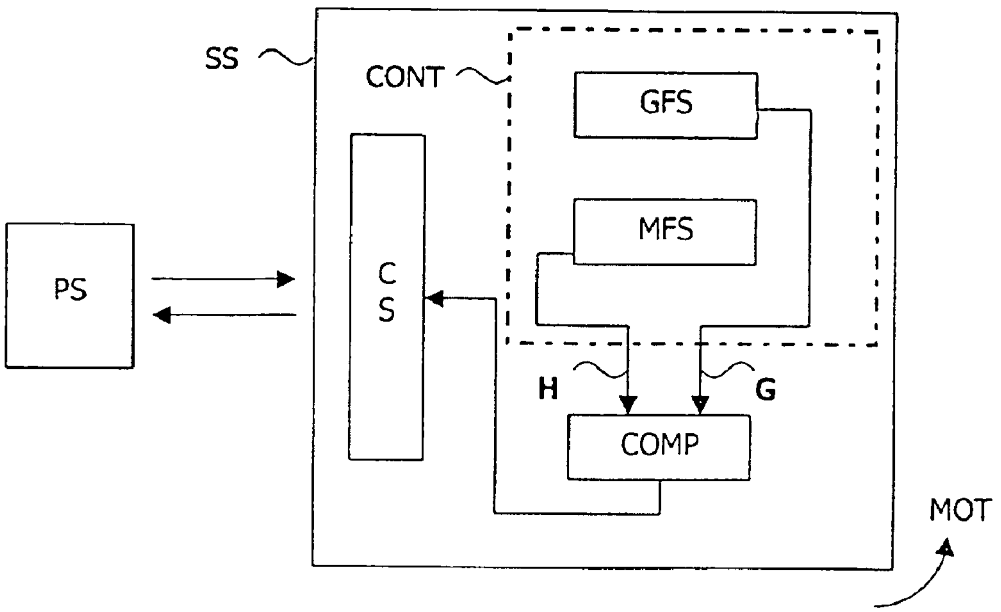
FIG. 1 shows a block diagram corresponding to the communication system according to the invention.

Such a communication system is depicted in FIG. 1. It comprises a primary radio station (PS) and at least one secondary radio station (SS), intended to be in motion (MOT). The secondary radio station has at least one controllable structure (CS) for communicating with the primary radio station, and control means (CONT) for controlling the controllable structure depending on the movements of the secondary radio station. The control means (CONT) of the controllable structure (CS) comprise magnetic field sensors (MFS) and gravitational field sensors (GFS), for providing measurements of the earth magnetic (H) and gravitational (G) fields, and computing means (COMP), which can be, for example, a micro-controller. The computing means read the outputs from each sensor and make the calculations required to control the controllable structure at appropriate time intervals depending on the motion state of the secondary radio station.

In the preferred embodiment, the magnetic field and the gravitational field sensors are three-dimensional sensors. Preferably, the three-dimensional magnetic field sensor is a sensor using three, preferably orthogonal, AMR (Anisotropic Magneto Resistive) magnetic field sensor elements that are cheap and have a very fast response time. The three-dimensional gravitational field sensor is preferably the association of two two-dimensional gravitational field sensor elements that are also quite cheap components and have a fast response time.

Figure 2:
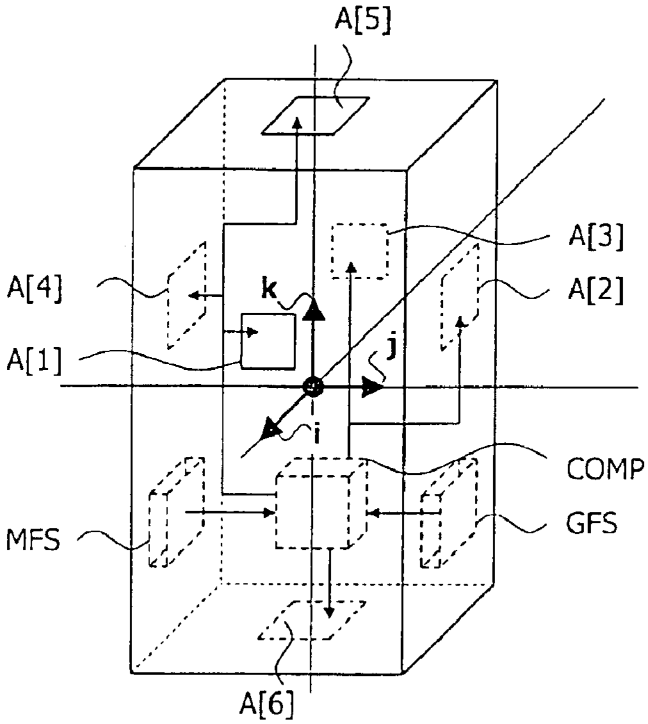
FIG. 2 shows a schematic perspective view of a MS-SDMA portable mobile station comprising a plurality of directional antennas according to the invention.

In the preferred embodiment, the communication system is a MS-SDMA communication system in which the primary radio station is a radio base station and the secondary radio station is a portable mobile station. The portable mobile station is equipped with a controllable structure that comprises a plurality of directional antennas. FIG. 2 represents, as an example, six selectable antennas A[n] (n=1 to 6) as a controllable antenna structure. The controllable antenna structure is controlled by magnetic field sensors (MFS), gravitational field sensors (GFS) and computing means (COMP) that process the measurements performed by these sensors.

In another embodiment the controllable structure comprises a phased array antenna system. Such a controllable antenna structure is only usable for a communication system according to the present invention, working at frequencies higher than 10 GHz. In the near future, the use of new materials can also make the integration possible of a phased array antenna with a mobile station for radio frequencies of the order of a few GHz.

The following part describes the computing method corresponding to the preferred embodiment. In order to determine an absolute measurement of radiation directions of the controllable antenna structure, this computing method needs to include a converting step for converting the known coordinates of the vector defining a radiation direction of the controllable antenna structure in a moving three-dimensional coordinate system rigidly attached to the secondary radio station, which will hereafter be called local coordinate system, into its corresponding coordinates in a fixed three-dimensional coordinate system rigidly attached to earth, which will hereafter be called global coordinate system. To this end, the computing method uses the three-dimensional measurements of the earth magnetic field and of the earth gravitational field as well as the values of reference angles associated with the earth magnetic field, the inclination and the declination, which will be defined later.

The local coordinate is defined by a set of three orthogonal vectors (i, j, k) of unit length (see FIG. 2). The global coordinate system is defined by a set of three orthogonal vectors (I, J, K) of unit length. The I, J, K system is defined according to FIG. 3:

I is coincident with the direction of the earth gravitational field (G).,

J is coincident with the direction of the geographic north (N).

K is coincident with the direction of the geographic east (E).

In the case of a controllable structure that comprises a plurality of directional antennas, each mobile station antenna is characterized by its maximum radiation direction, called heading. Considering an antenna A[n], its heading is defined by a vector r. With reference to the local coordinate system, this vector is expressed as:

$$r=r_x i+r_y j+r_z k \qquad [1]$$

where $r_x$, $r_y$ and $r_z$ are parameters known from the mechanical design of the mobile station.

The antenna heading is expressed in the global coordinate system as:

$$r=R_x I+R_y J+R_z K \qquad [2]$$

where the coordinates $R_x$, $R_y$ and $R_z$ are unknown. Moreover, these values change with the relative position of the mobile station and the earth.

Figure 4:
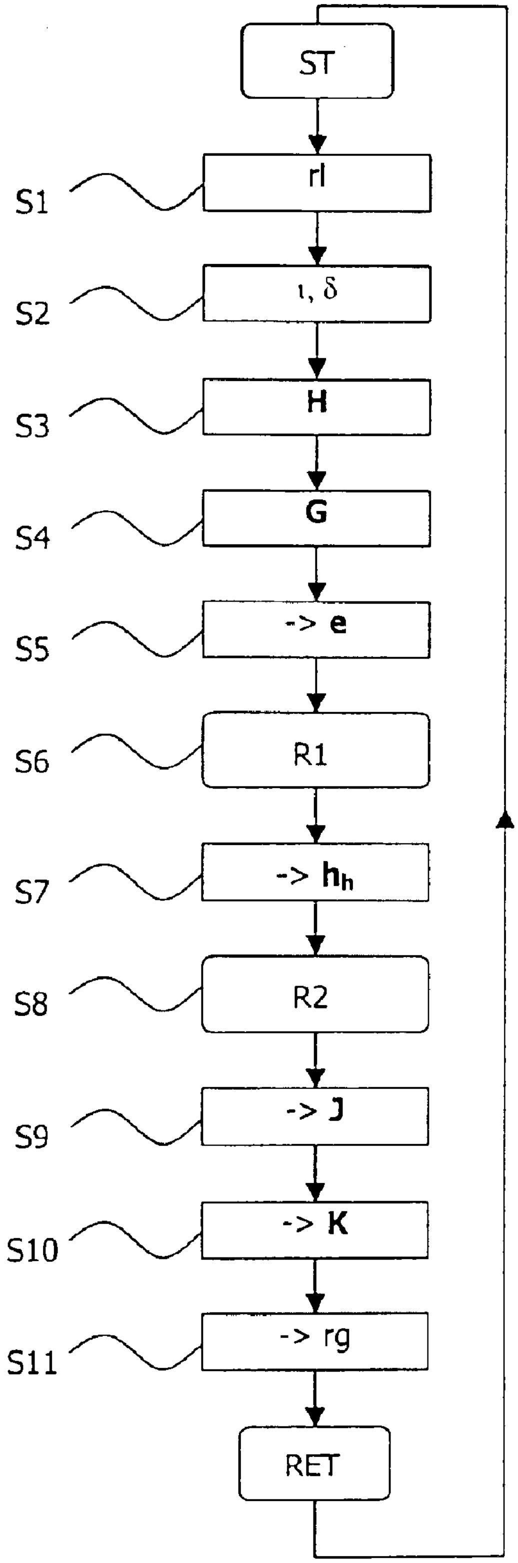
FIG. 4 shows a block diagram corresponding to the computing method according to the invention.

FIG. 4 describes the various steps that lead to the conversion from the local coordinates ($r_x$, $r_y$, $r_z$) into the global coordinates ($R_x$, $R_y$, $R_z$).

At appropriate time intervals, the computing procedure starts (ST).

During a step S1, the local coordinates (rl) corresponding to the vector r are downloaded. These values are stored in a table for each mobile station antenna A[n]. In this table, $r_x[n]$, $r_y[n]$, $r_z[n]$ are data dependent on the mechanical design of the mobile station, which will usually not change during its operating life. Therefore, they are stored, for example, in a Read Only Memory (ROM).

Figure 5:
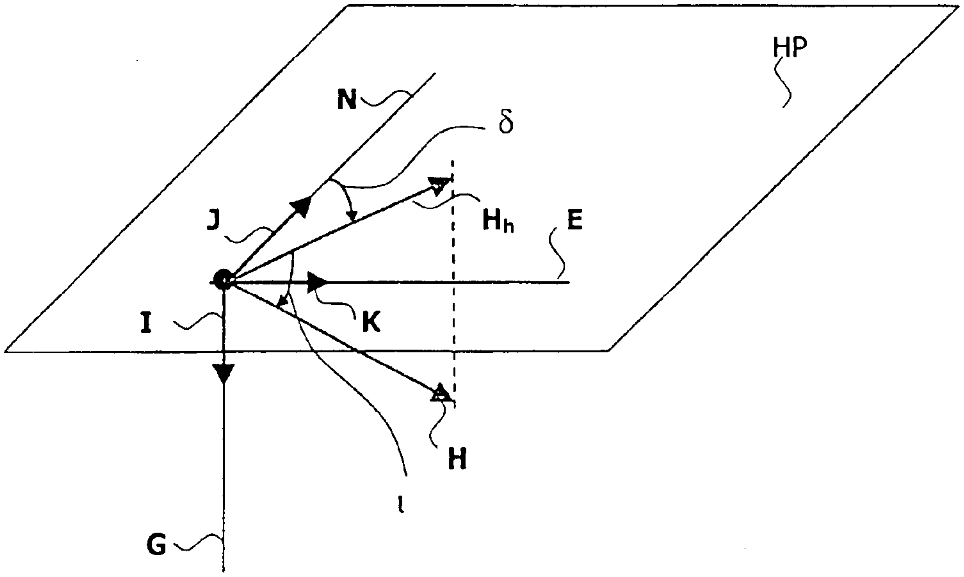
FIG. 5 shows the gravitational and the magnetic fields in the fixed coordinate system attached to earth.

During a step S2, the values of reference angles associated with the earth magnetic field H are downloaded. These reference angles are the inclination and the declination and are defined according to FIG. 5:

declination (δ) is the angle between the direction of the geographic north (N) and the horizontal projection, in the horizontal plane (HP), of the earth magnetic field H, Hh. This value is measured positive through east (E) and varies between 0 and 360 degrees.

inclination (ι) is the angle between the horizontal projection of the earth magnetic field H, Hh and the earth magnetic field H. Positive inclinations correspond to a vector H pointing downward, negative inclinations to a vector H pointing upward. Inclination varies between −90 and 90 degrees.

The values of the inclination and declination depend on the position of the mobile station on earth. They are calculated on the basis of the geographical coordinates of the mobile station. The declination and inclination angles are also variable with time, following to the so-called "secular" variations. Dedicated observatories have measured these variations during several centuries. The worst-case secular variation in the last 500 years has been of 2 degrees per decade. Taking into account that the directivity of current mobile antennas is wider than this figure, it is possible to use a fixed value for the declination and inclination without a significant impairment to the performance of the communication system.

In the present invention, the values of the declination and inclination at the position of the mobile station can be obtained in different ways:

- by reception from the radio base station. The radio base station may broadcast the declination and inclination of its position, by means of a common downlink channel. This type of channels is found in most cellular systems. Although the values of declination and inclination at the radio base station are not exactly the same as in the position of the mobile station, the difference is very small for the normal size of a mobile communication cell.
- by reading an on-board geographical data base of declinations and inclinations expressed as a function of the mobile station's geographical coordinates (latitude/longitude). The mobile station coordinates are provided by the fixed part of the mobile communication network (using, for example, trilaterization methods) or by an on-board GPS receiver.
- by periodic consultation of an internet geographical data base, that returns the declination and inclination as a function of the mobile station's geographical coordinates. Radio packet services available in all second and third generation mobile network standards are able to provide this service in a fast, reliable and inexpensive way.

The values of the inclination and declination can be stored in any type of memory, depending on the previously described acquisition mode. In a preferred embodiment, this memory is a flash memory.

During a step S3, magneto-resistive field sensors with the sensitivity and accuracy required for the measurement of the earth magnetic field and attached to the mobile station, provide the measurements of the local coordinates of the earth magnetic field H.

The earth magnetic field is expressed in the local coordinate system as follows:

$$H=H_x i+H_y j+H_z k \qquad [3]$$

The direction of the earth magnetic field is then expressed by a vector h having the same direction as H but unit length:

$$h=\frac{1}{H}H=\frac{H_x}{H}i+\frac{H_y}{H}j+\frac{H_z}{H}k=h_x i+h_y j+h_z k \qquad [4]$$

where H is the field strength.

During a step S4, gravitational field sensors with adequate sensitivity and accuracy required for the measurement of the earth gravitational field and attached to the mobile station, provide the measurements of the local coordinates of the earth gravitational field G. The earth gravitational field is expressed in the local coordinate system as follows:

$$G=G_x i+G_y j+G_z k \qquad [5]$$

The direction of the earth gravitational field is expressed by a vector g having the same direction as G but unit length:

$$g=\frac{1}{G}G=\frac{G_x}{G}i+\frac{G_y}{G}j+\frac{G_z}{G}k=g_x i+g_y j+g_z k \qquad [6]$$

where G is the field strength.

Figure 3:
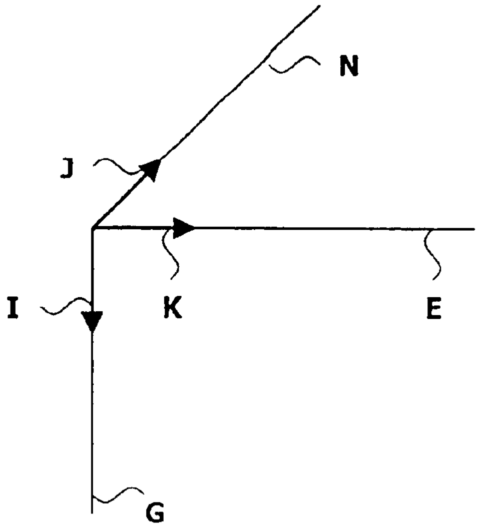
FIG. 3 shows a fixed coordinate system attached to earth.

According to FIG. 3, I is a vector of unit length which direction is coincident with the earth gravitational field. This is precisely the definition of g, which is expressed according to [6]. Therefore:

$$I=g_x i+g_y j+g_z k \qquad [7]$$

Vector h is carried over J by means of two consecutive rotations:

A first rotation around the axis I$\otimes$h, of angle ι. This movement will put h over the horizontal plane (HP).

A second rotation around the axis I, of angle δ. This movement will put h directly over the vector J.

Vector rotations are linear transformations that are represented by a 3×3 matrix: $R_i$ (u,α). The components of Ri are expressed as a function of the coordinates of the vector defining the rotation axis u ($u_x$, $u_y$, $u_z$) and of the rotation angle (α) as follows:

$$R_i=\begin{bmatrix} r_{11} & r_{12} & r_{13} \\ r_{21} & r_{22} & r_{23} \\ r_{31} & r_{32} & r_{33} \end{bmatrix} \text{ with } \begin{cases} r_{11}=u_x^2+(1-u_x^2)\cos\alpha \\ r_{12}=u_x u_y(1-\cos\alpha)+u_z\sin\alpha \\ r_{13}=u_x u_z(1-\cos\alpha)-u_y\sin\alpha \\ r_{21}=u_x u_y(1-\cos\alpha)-u_z\sin\alpha \\ r_{22}=u_y^2+(1-u_y^2)\cos\alpha \\ r_{23}=u_y u_z(1-\cos\alpha)+u_x\sin\alpha \\ r_{31}=u_x u_z(1-\cos\alpha)+u_y\sin\alpha \\ r_{32}=u_x u_z(1-\cos\alpha)+u_x\sin\alpha \\ r_{33}=u_z^2+(1-u_z^2)\cos\alpha \end{cases}$$

During a step S5, the coordinates of the vector e of unit length corresponding to the first rotation axis are calculated as follows:

$$e=\frac{I\otimes h}{|I\otimes h|} \qquad [8]$$

The components of e are derived using the expressions [4] and [7]:

$$e_x=\frac{g_y h_z-g_z h_y}{\sqrt{(g_y h_z-g_z h_y)^2+(g_z h_x-g_x h_z)^2+(g_x h_y-g_y h_x)^2}} \qquad [9]$$

$$e_y=\frac{g_z h_x-g_x h_z}{\sqrt{(g_y h_z-g_z h_y)^2+(g_z h_x-g_x h_z)^2+(g_x h_y-g_y h_x)^2}} \qquad [10]$$

$$e_z=\frac{g_y h_y-g_y h_x}{\sqrt{(g_y h_z-g_z h_y)^2+(g_z h_x-g_x h_z)^2+(g_x h_y-g_y h_x)^2}} \qquad [11]$$

During a step S6, the first rotation R1(e, ι) is called. The calculated coefficients of the matrix corresponding to this vector rotation are:

$$\overline{r_{ij}} = r_{ij}(e_x, e_y, e_z, t) = \begin{bmatrix} \overline{r_{11}} & \overline{r_{12}} & \overline{r_{13}} \\ \overline{r_{21}} & \overline{r_{22}} & \overline{r_{23}} \\ \overline{r_{31}} & \overline{r_{32}} & \overline{r_{33}} \end{bmatrix} \quad [12]$$

During a step S7, the vector $h_h$ is derived as follows:

$$h_h = R_1 h \quad [13]$$

After computing, it results in:

$$h_h = h_{hx} i + h_{hy} j + h_{hz} k \quad [14]$$

where:

$$h_{hx} = h_x \overline{r_{11}} + h_y \overline{r_{21}} + h_z \overline{r_{31}} \quad [15]$$

$$h_{hy} = h_x \overline{r_{12}} + h_y \overline{r_{22}} + h_z \overline{r_{32}} \quad [16]$$

$$h_{hz} = h_x \overline{r_{13}} + h_y \overline{r_{23}} + h_z \overline{r_{33}} \quad [17]$$

During a step S8, the second rotation $R_2(g, \delta)$ is called. The calculated coefficients of the matrix corresponding to this vector rotation are:

$$\overline{\overline{r_{ij}}} = r_{ij}(g_x, g_y, g_z, \delta) = \begin{bmatrix} \overline{\overline{r_{11}}} & \overline{\overline{r_{12}}} & \overline{\overline{r_{13}}} \\ \overline{\overline{r_{21}}} & \overline{\overline{r_{22}}} & \overline{\overline{r_{23}}} \\ \overline{\overline{r_{31}}} & \overline{\overline{r_{32}}} & \overline{\overline{r_{33}}} \end{bmatrix} \quad [18]$$

During a step S9, the vector J is derived as follows:

$$J = R_2 h_h \quad [19]$$

After computing, it results in:

$$J = J_x i + J_y j + J_z k \quad [20]$$

where:

$$J_x = h_{hx} \overline{\overline{r_{11}}} + h_{hy} \overline{\overline{r_{21}}} + h_{hz} \overline{\overline{r_{31}}} \quad [21]$$

$$J_y = h_{hx} \overline{\overline{r_{12}}} + h_{hy} \overline{\overline{r_{22}}} + h_{hz} \overline{\overline{r_{32}}} \quad [22]$$

$$J_x = h_{hx} \overline{\overline{r_{13}}} + h_{hy} \overline{\overline{r_{23}}} + h_{hz} \overline{\overline{r_{33}}} \quad [23]$$

During a step S10, Vector K is obtained as follows:

$$K = K_x i + K_y j + K_z k = I \otimes J \quad [24]$$

Using the expressions of I and J given by [7] and [20]:

$$K = (g_y J_z - g_z J_y) i + (g_z J_x - g_x J_z) j + (g_x J_y - g_y J_x) k \quad [25]$$

During a step S11, the expression of the vector r in the local coordinate system is derived from the expression [2] of the same vector in the global coordinate system, and by replacing I, J and K with their expressions [7], [20] and [25]:

$$r = (R_x g_x + R_y J_x + R_z K_x) i + (R_x g_y + R_y J_y + R_z K_y) j + (R_x g_z + R_y J_z + R_z K_z) k \quad [26]$$

Considering the expression [26] of r and identifying the coefficients to the ones of the expression [1] results in:

$$g_x R_x + J_x R_y + K_x R_z = r_x \quad [27]$$

$$g_y R_x + J_y R_y + K_y R_z = r_y \quad [28]$$

$$g_z R_x + J_z R_y + K_z R_z = r_z \quad [29]$$

The solution of the linear system with unknowns $R_x$, $R_y$, $R_z$ is obtained by using the Cramer's method, and provides the coordinates (rg) of the vector defining the antenna's heading in the global coordinate system:

$$R_x = \frac{\Delta_x}{\Delta} \quad [30]$$

$$R_y = \frac{\Delta_y}{\Delta} \quad [31]$$

$$R_z = \frac{\Delta_z}{\Delta} \quad [32]$$

where:

$$\Delta_x = J_y K_z r_x + J_x K_y r_z + J_z K_x r_y - (J_y K_x r_z + J_z K_y r_x + J_x K_z r_y) \quad [33]$$

$$\Delta_y = g_x K_z r_y + g_z K_y r_x + g_y K_x r_z - (g_z K_x r_y + g_x K_y r_z + g_y K_z r_x) \quad [34]$$

$$\Delta_z = g_x J_y r_z + g_z J_x r_y + g_y J_z r_x - (g_z J_y r_x + g_x J_z r_y + g_y J_x r_z) \quad [35]$$

$$\Delta = g_x J_y K_z + g_z J_x K_y + g_y J_z K_x - (g_z J_y K_x + g_x J_z K_y + g_y J_x K_z) \quad [36]$$

The values $R_x[n]$, $R_y[n]$ $R_z[n]$ depend on the mobile station position. They can be stored, for example, in a Random Access Memory (RAM) and are replaced at appropriate time intervals depending on the motion state of the mobile station.

At the end of the calculation, the procedure returns (RET) to the starting point.

These calculations are then used to control the controllable antenna structure, which is to select the most suitable antenna in the case of a controllable antenna structure comprising a plurality of directional antennas or to realign a phased array antenna in the case of a controllable antenna structure comprising a phased array antenna system, this operation being performed in order to provide optimum conditions for communication, irrespective of the motion state of the secondary radio station. To this end, the selection of an appropriate antenna in the set of directional antennas or the realignment of the phased array antenna is performed, at appropriate time intervals, with respect to a reference direction, which corresponds, in the preferred embodiment, to the primary radio station heading.

The Electronic Engineers' Handbook, $4^{th}$ edition, by D. Fink et al. (ISBN 0-07-021077-2) describes a method of finding this reference direction in section 29.3.1.1.1 on page 29.82. Its principle of operation is based on the use of a single transmitter source whose signal is received at two known points or elements. The direction from a vehicle to the source is determined by the measurement of the differential phase of the signals at the two points or elements.

Another method of radio signal direction finding is described in undisclosed European Patent application no. 98 402738.3 filed by Koninklijke Philips Electronics N.V. This method calculates an angle of arrival of the radio signal RF in a Cartesian system which is defined, for example, by the antennas A[1] and A[2]. Subsequently, the method calculates an angle of arrival of the radio signal RF in another Cartesian system which is defined, for example, by antennas A[2] and A[3]. Using the calculated angles of arrival, a three-dimensional bearing vector is calculated, which points to the source of the radio signal RF and is coincident with the reference direction.

The bearing vector obtained with this method is known in the local coordinate system. It is then converted into the global coordinate system using the converting method previously described. In the set of directional antennas, the antenna whose pattern best corresponds to the three-dimensional bearing vector in the global coordinate system (that is the antenna that provides the highest gain in the direction of the source of the radio signal RF) is selected.

Other methods can also be used to obtain the bearing vector, such as for example, methods based on GPS measurements.

Figure 6:
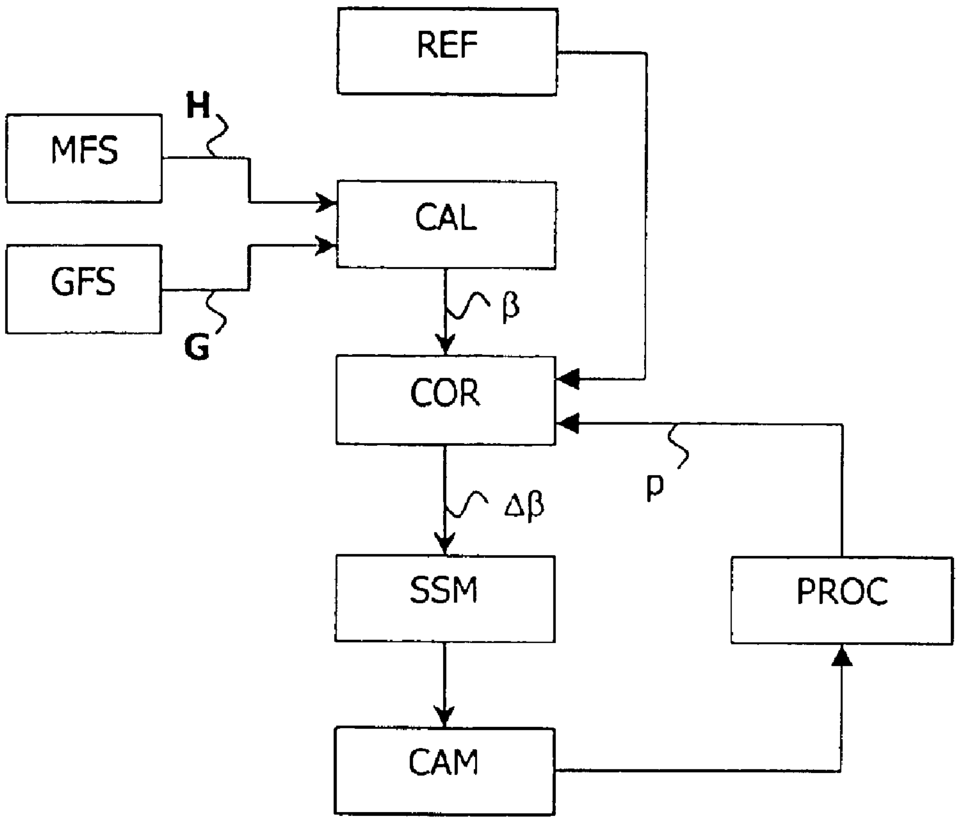
FIG. 6 shows a block diagram corresponding to a device for controlling the position of a camera integrated in a communication system according to the invention.

FIG. 6 describes a second embodiment corresponding to a method and device for controlling the position of a camera integrated in a communication system according to the invention. It applies more specifically to the positioning control of a camera irrespective of the motion state of the camera support. Such a camera can be, for example, integrated in a mobile radio station.

The camera (CAM) is movable relative to its support, which is the mobile station body and the mobile station has control means for controlling the camera position. The following operations are performed to control the camera position.

During an initialization step (REF), the initial Euler angles ($\beta_1(0)$, $\beta_2(0)$, $\beta_3(0)$) of the local coordinate system with regard to the global coordinate system are defined. The Euler angles ($\beta_1$, $\beta_2$, $\beta_3$) allow to go from a first reference system ($u_1$ $u_2$, $u_3$) to a second reference system ($u_1$, $u_2$, $u_3$) with three consecutive rotations:

a first one, $Rot_1$, around $u_1$ with an angle $\beta_1$:

$$Rot_1 = \begin{bmatrix} 1 & 0 & 0 \\ 0 & \cos\beta_1 & \sin\beta_1 \\ 0 & -\sin\beta_1 & \cos\beta_1 \end{bmatrix}$$

a second one, $Rot_2$, around $u_2$ with an angle $\beta_2$:

$$Rot_2 = \begin{bmatrix} \cos\beta_2 & 0 & \sin\beta_2 \\ 0 & 1 & 0 \\ -\sin\beta_2 & 0 & \cos\beta_2 \end{bmatrix}$$

a third one, $Rot_3$, around $u_3$ with an angle $\beta_3$:

$$Rot_3 = \begin{bmatrix} \cos\beta_3 & \sin\beta_3 & 0 \\ -\sin\beta_3 & \cos\beta_3 & 0 \\ 0 & 0 & 1 \end{bmatrix}$$

The initial angles correspond to the reference position in which the camera has to be maintained and are, for example, mechanically adjusted by the user. Then, the following steps are regularly performed.

At a second step, the computing means (CAL) first determine the global coordinate system from the measurements of the gravitational field (G) and magnetic field (H) respectively provided by the three-dimensional gravitational and magnetic field sensors (GFS and MFS). In the second embodiment, the global coordinate system is defined by the following orthogonal system ($u_1$, $u_2$, $u_3$) where:

$$u_1 = \frac{G}{\|G\|};\ u_2 = \frac{\frac{H}{\|H\|} - \sin(t)u_1}{\left\|\frac{H}{\|H\|} - \sin(t)u_1\right\|};$$

-continued $$u_3 = u_1 \otimes u_2;\ t \text{ being the inclination}$$

As a consequence, the computing means (CAL) provides the current Euler angles ($\beta_1(t)$, $\beta_2(t)$, $\beta_3(t)$) of the local coordinate system attached to the support with regard to the global coordinate system, where t is the calculation time.

At a third step, the correction means (COR) computes from the initial Euler angles and the current Euler angles the rotations ($\Delta\beta_1(t)$, $\Delta\beta_2(t)$, $\Delta\beta_3(t)$), which has been done by the camera support:

$$\Delta\beta_i(t)=\beta_i(t)-\beta_i(0), \text{ with } i=1, 2 \text{ or } 3$$

Finally, the control means drive a device, a step by step motor (SSM) for example, which performs the rotations ($-\Delta\beta_1(t)$, $-\Delta\beta_2(t)$, $-\Delta\beta_3(t)$) computed by the correction means (COR) in order to maintain the camera in a defined position.

The control of the camera positioning can be improved by adding data processing means (PROC) that allow, for example, the recognition of an object and the prediction of the object movement within a sequence of pictures provided by the camera (CAM). For this purpose, the pictures are first digitized. The recognition of an object in the picture is based on the detection of invariants, which are parameters of said object, using a Fourier transform or a Fourier-Mellin transform. The detection of invariants is independent of the scaling in that case. The prediction of the object movement is then performed using motion estimation means. For reasons of cost of memory, a sub-sampling of the pictures can be performed before the data processing means (PROC) are applied.

Consequently, such a system can follow, for example, the movement of an element of the picture using the motion predictions (p) given by the image processing means (PROC). The correction means (COR) in this case perform the rotations to be made by the step-by-step motor (SSM), enabling the motion of the camera when the element moves by adding the angles due to the element motion to the ones of the camera support.

Other data processing means (PROC), such as for example, means for voice recognition and the localization of the voice source can also be provided for defining the reference position in which the camera has to be maintained by the control means.

What is claimed is:

1. A communication system having at least one primary radio station (PS) and at least one secondary radio station (SS) intended to be in motion (MOT), said secondary radio station having at least one controllable structure (CS) for communicating with said primary radio station, and control means (CONT) for controlling said controllable structure depending on said motion, said control means comprising magnetic field sensors (MFS) for providing measurements of the earth magnetic field (H), characterized in that said control means comprise also gravitational field sensors (GFS) for providing measurements of the earth gravitational field (G), and computing means (COMP) for computing control information from said measurements, wherein said control means comprise a memory for storing inclination (ι) and declination (δ) values of the earth magnetic field, and said computing means include a converting step for converting coordinates (rl) of positioning information in a moving coordinate system attached to the secondary radio station, said coordinates being called local coordinates, into corresponding coordinates (rg) in a fixed coordinate system attached to earth, said coordinates being called global coordinates, this conversion being calculated from said values and measurements of said magnetic field and gravitational field sensors.

2. The communication system as claimed in claim 1, characterized in that said computing means allow the determination of a reference direction which is defined by a bearing vector first calculated in the local coordinate system and then converted into the global coordinate system using the converting step, said controllable structure comprises a set of directional antennas having a maximum radiation direction called heading, said converting step converts coordinates of a vector defining said heading of at least one of the directional antennas from said local coordinates into said global coordinates and said control means are intended to select at least one directional antenna among the set of directional antennas with respect to the reference direction.

3. The communication system as claimed in claim 1, characterized in that said computing means allow the determination of a reference direction, said controllable structure comprises a phased array antenna system and said control means are intended to keep the phased array system steered towards the reference direction.

4. The communication system as claimed in claim 1, characterized in that said controllable structure comprises a camera which is movable relative to its support and which position is controlled by said control means from correction angles that are calculated by the computing means.

5. The communication system as claimed in claim 4, characterized in that the position in which the camera has to be maintained by the control means is determined by data processing means (PROC) that process digital pictures acquired by acquisition means and comprises recognition means to identify an object in the picture and motion estimation means to determine a movement of said object.

6. A radio station for use in a communication system, said radio station having at least one controllable structure and control means for controlling said controllable structure depending on a movement of said radio station, said control means comprising magnetic field sensors for providing measurements of the earth magnetic field, characterized in that said control means comprise also gravitational field sensors for providing measurements of the earth gravitational field, and computing means for computing control information from said measurements, wherein said control means comprise a memory for storing inclination ($\iota$) and declination ($\delta$) values of the earth magnetic field, and said computing means include a converting step for converting coordinates (rl) of positioning information in a moving coordinate system attached to the secondary radio station, said coordinates being called local coordinates, into corresponding coordinates (rg) in a fixed coordinate system attached to earth, said coordinates being called global coordinates, this conversion being calculated from said values and measurements of said magnetic field and gravitational field sensors.

7. The radio station as claimed in claim 6, wherein said computing means allow the determination of a reference direction which is defined by a bearing vector first calculated in the local coordinate system and then converted into the global coordinate system using the converting step, said controllable structure comprises a set of directional antennas having a maximum radiation direction called heading, said converting step converts coordinates of a vector defining said heading of at least one of the directional antennas from said local coordinates into said global coordinates and said control means are intended to select at least one directional antenna among the set of directional antennas with respect to the reference direction.

8. The radio station as claimed in claim 6, wherein said computing means allow the determination of a reference direction, said controllable structure comprises a phased array antenna system and said control means are intended to keep the phased array system steered towards the reference direction.

9. The communication system as claimed in claim 6, wherein said controllable structure includes a camera which is movable relative to its support and which position is controlled by said control means from correction angles that are calculated by the computing means.

10. The communication system as claimed in claim 9, wherein the position in which the camera has to be maintained by the control means is determined by data processing means (PROC) that process digital pictures acquired by acquisition means and comprises recognition means to identify an object in the picture and motion estimation means to determine a movement of said object.

11. A radio station for use in a communication system, said radio station comprising:

a plurality of directional antennas;

means for obtaining a first set of local coordinates for each antenna of said plurality of directional antennas;

means for obtaining an inclination angle and a declination angle associated with a magnetic field of the earth;

a magnetic field sensor for measuring a second set of local coordinates of the magnetic field of the earth;

means for determining a first vector indicative of a direction of the magnetic field of the earth;

a gravitational field sensor for measuring a third set of local coordinates of a gravitational field of the earth;

means for determining a second vector indicative of a direction of the gravitational field of the earth;

means for deriving a global coordinates of said plurality of directional antennas from the first vector and the second vector; and means for deriving coordinates of an antenna heading in a global coordinate system from the global coordinates.

12. A method of controlling a controllable structure based on control information from measurements of an earth magnetic and gravitational fields provided respectively by at least one magnetic field sensor and at least one gravitational field sensor, the method comprising:

storing inclination ($\iota$) and declination ($\delta$) values of the earth magnetic field; and converting local coordinates (rl) of positioning information in a moving coordinate system attached to the controllable structure into corresponding global coordinates (rg) in a fixed coordinate system attached to earth to thereby control the controllable structure, wherein said conversion is calculated from the inclination ($\iota$) and declination ($\delta$) values of the earth magnetic field, and from the measurements of the earth magnetic and gravitational fields provided respectively by the at least one magnetic field sensor and at least one gravitational field sensor.

* * * * *